United States Patent
Fasola et al.

(10) Patent No.: US 12,122,412 B2
(45) Date of Patent: Oct. 22, 2024

(54) HIGH DEFINITION MAP UPDATES USING ASSETS GENERATED BY AN AUTONOMOUS VEHICLE FLEET

(71) Applicant: GM Cruise Holdings, LLC, San Francisco, CA (US)

(72) Inventors: Juan Fasola, San Francisco, CA (US); Srishti Koduvayur, Emeryville, CA (US); Shreyans Kushwaha, San Mateo, CA (US); Chia-Wei Lin, San Francisco, CA (US); Eugene Lo, Chino Hills, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 30 days.

(21) Appl. No.: 17/173,730

(22) Filed: Feb. 11, 2021

(65) Prior Publication Data
US 2022/0250642 A1    Aug. 11, 2022

(51) Int. Cl.
*B60W 60/00* (2020.01)
*G01C 21/00* (2006.01)
*G01C 21/36* (2006.01)
*G08G 1/00* (2006.01)

(52) U.S. Cl.
CPC ......... *B60W 60/001* (2020.02); *G01C 21/367* (2013.01); *G01C 21/3676* (2013.01); *G01C 21/3804* (2020.08); *G08G 1/20* (2013.01)

(58) Field of Classification Search
None
See application file for complete search history.

(56) References Cited

U.S. PATENT DOCUMENTS

| | | | |
|---|---|---|---|
| 11,162,798 B2 | 11/2021 | Rusignola et al. | |
| 2013/0064474 A1 | 3/2013 | Maslov et al. | |
| 2018/0188037 A1* | 7/2018 | Wheeler | G01C 21/3848 |
| 2018/0188042 A1* | 7/2018 | Chen | G01C 21/3848 |
| 2019/0019409 A1* | 1/2019 | Farr | G08G 1/09626 |
| 2019/0122386 A1* | 4/2019 | Wheeler | G01C 21/1652 |
| 2019/0392635 A1* | 12/2019 | Ma | G01C 21/3841 |
| 2020/0003897 A1 | 1/2020 | Zoox | |
| 2020/0284590 A1* | 9/2020 | Chen | G01C 21/3819 |
| 2020/0292331 A1* | 9/2020 | Rabel | G06F 16/909 |
| 2020/0296558 A1* | 9/2020 | Adare | H04W 68/005 |
| 2020/0400441 A1* | 12/2020 | Efland | G01C 21/387 |
| 2021/0004021 A1* | 1/2021 | Zhang | G05D 1/0274 |
| 2021/0404839 A1* | 12/2021 | Jiang | B60W 60/0025 |
| 2022/0081004 A1* | 3/2022 | Brown | G08G 1/166 |
| 2022/0113159 A1* | 4/2022 | Hou | G01C 21/3461 |
| 2022/0197286 A1* | 6/2022 | Zhang | G01C 21/3848 |

\* cited by examiner

*Primary Examiner* — Rachid Bendidi
*Assistant Examiner* — Selena M Jin

(57) ABSTRACT

The disclosed technology provides solutions for updating high definition maps based on low resolution map assets. In some aspects, a process of receiving a change detection relating to a change in the real world is provided. The process can include steps for receiving autonomous vehicle drive data based on the change in the real world, generating low resolution tile data based on the autonomous vehicle drive data based on the change in the real world, generating updated semantic data based on the low resolution tile data generated, and providing the updated semantic data to an autonomous vehicle to update a proximate area of the change in the real world of a base map of the autonomous vehicle. Systems and machine-readable media are also provided.

19 Claims, 6 Drawing Sheets

HIGH DEFINITION MAP UPDATES USING ASSETS GENERATED BY AN AUTONOMOUS VEHICLE FLEET

BACKGROUND

1. Technical Field

The subject technology provides solutions for autonomous vehicles, and in particular, for updating high definition maps based on low resolution map assets.

2. Introduction

Autonomous vehicles (AVs) are vehicles having computers and control systems that perform driving and navigation tasks that are conventionally performed by a human driver. As AV technologies continue to advance, ride-sharing services will increasingly utilize AVs to improve service efficiency and safety. However, AVs will be required to perform many of the functions that are conventionally performed by human drivers, such as avoiding dangerous or difficult routes, and performing other navigation and routing tasks necessary to provide a safe and efficient transportation. Such tasks may require the collection and processing of large quantities of data using various sensor types, including but not limited to cameras, radars, and/or Light Detection and Ranging (LiDAR) sensors disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
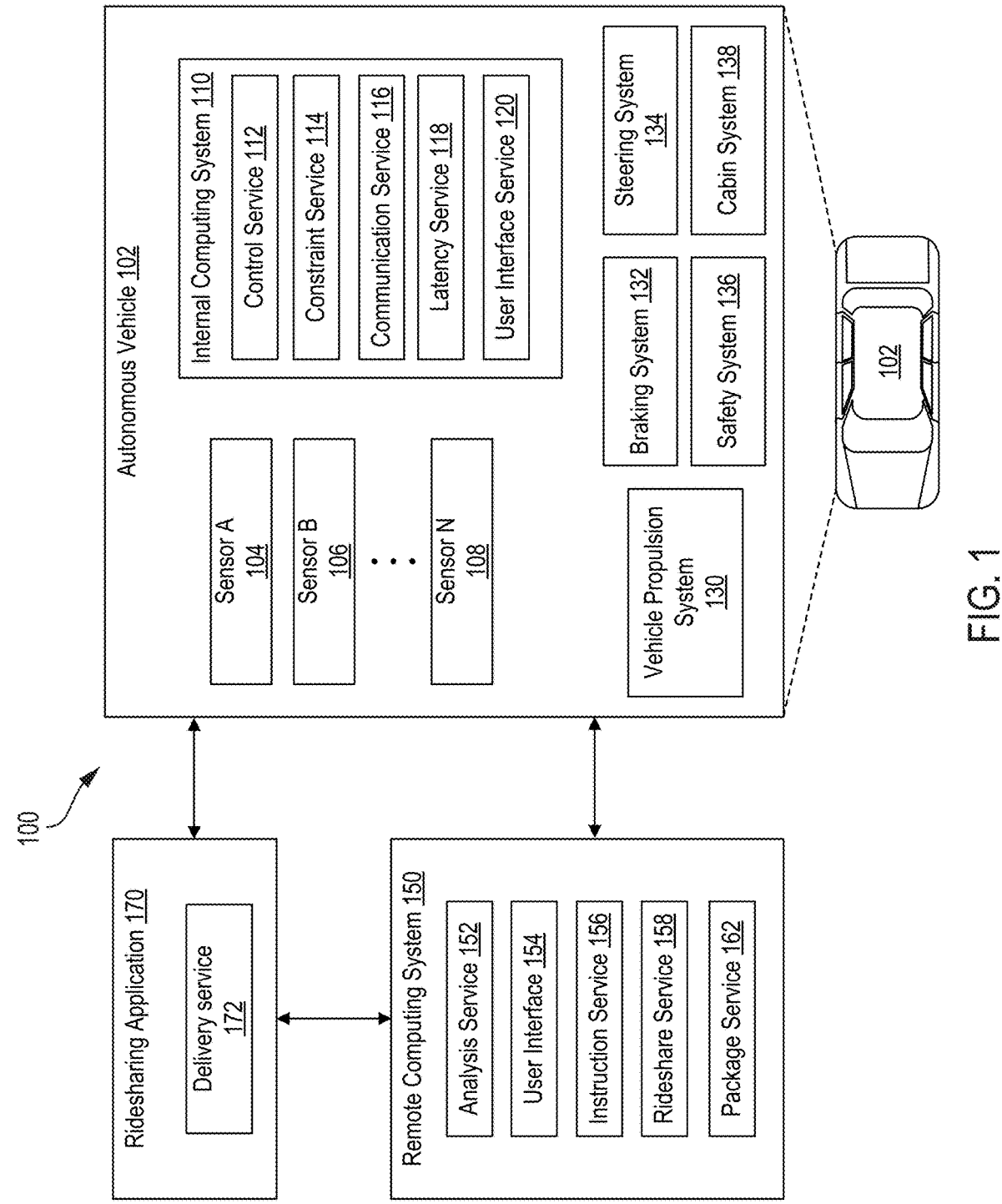
FIG. 1 illustrates an example system environment that can be used to facilitate autonomous vehicle navigation and routing operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the updating of high definition maps based on low resolution map assets. The present disclosure contemplates that in some instances, the low resolution map assets may provide updates to an autonomous vehicle regarding an avoidance area. The present disclosure contemplates utilizing high resolution tile tracking, low resolution tile tracking, and/or semantic label tracking.

In conventional autonomous vehicle (AV) deployments, there are two types of map updates: 1) Base Lidar Map Updates; and 2) Semantic Feature Updates. Both types of map updates require data collection using "mapping cars" that drive around to collect high resolution lidar and camera data, which is then processed to generate assets that are ready for labelling. This process typically takes approximately days to potentially weeks from map data collection through mapping cars. In such cases, map assets are not being efficiently utilized and the process also adds extra, unnecessary latency to the map update time period. For example, this process adds latency to the map update process since the process is dependent on sending out mapping cars to map a given area to make any kind of small or large map updates.

Moreover, mapping operations are also limited by their ability of utilizing a mapping vehicle, which includes a special set of sensors to generate the high definition (HD) map (e.g., lidar maps) for the autonomous vehicle. As map changes are detected, avoidance area designations are established so that autonomous vehicles avoid these areas. This reduces routability, thereby increasing trip time and reducing the ability to launch a successful ride share service.

Aspects of the disclosed technology address the foregoing limitations of conventional map updates by providing solutions including providing updated map assets and 2D semantic features as the real world changes. In some aspects, the disclosed technology can reduce the time to respond to a change in the real world (e.g., via detection and signal). In other aspects, the disclosed technology can reduce the time to update semantic labels from a confirmed change to a semantic map. The disclosed technology can further improve the rate at which avoidance areas are lifted, thereby improving trip time, routing, and exposure to more mapped area for the autonomous vehicle. Moreover, the disclosed technology can include data collection efficiency including the time to update the lidar base map, which releases pressure on redrive pipelines/mapping vehicles. Furthermore, the disclosed technology can reduce the cost of maintaining the map, reduced by the cost of mapping vehicle operators and map processing pipelines.

As discussed in further detail below, the disclosed technology further contemplates a mapping operations workflow that can include: 1) reduced time for map data collection and semantic label updates; and 2) fully leverage data collected by autonomous vehicles for map updates and effective scaling of map data collection operations.

FIG. 1 illustrates an example system environment 100 that can be used to facilitate AV dispatch and operations, according to some aspects of the disclosed technology. Autonomous vehicle 102 can navigate about roadways without a human driver based upon sensor signals output by sensor systems 104, 106 . . . 108 of autonomous vehicle 102. Autonomous vehicle 102 includes a plurality of sensor systems 104-108 (a first sensor system 104 through an Nth sensor system 108). Sensor systems 104-108 are of different types and are arranged about the autonomous vehicle 102. For example, first sensor system 104 may be a camera sensor system and the Nth sensor system 108 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While two sensors 104, 106 are illustrated coupled to the autonomous vehicle 102, it is understood that more or fewer sensors may be coupled to the autonomous vehicle 102.

Autonomous vehicle 102 further includes several mechanical systems that are used to effectuate appropriate motion of the autonomous vehicle 102. For instance, the mechanical systems can include but are not limited to, vehicle propulsion system 130, braking system 132, and steering system 134. Vehicle propulsion system 130 may include an electric motor, an internal combustion engine, or both. The braking system 132 can include an engine brake, brake pads, actuators, and/or any other suitable componentry that is configured to assist in decelerating autonomous vehicle 102. In some cases, braking system 132 may charge a battery of the vehicle through regenerative braking. Steering system 134 includes suitable componentry that is configured to control the direction of movement of the autonomous vehicle 102 during navigation. Autonomous vehicle 102 further includes a safety system 136 that can include various lights and signal indicators, parking brake, airbags, etc. Autonomous vehicle 102 further includes a cabin system 138 that can include cabin temperature control systems, in-cabin entertainment systems, etc.

Autonomous vehicle 102 additionally comprises an internal computing system 110 that is in communication with sensor systems 104-108 and systems 130, 132, 134, 136, and 138. Internal computing system 110 includes at least one processor and at least one memory having computer-executable instructions that are executed by the processor. The computer-executable instructions can make up one or more services responsible for controlling autonomous vehicle 102, communicating with remote computing system 150, receiving inputs from passengers or human co-pilots, logging metrics regarding data collected by sensor systems 180 and human co-pilots, etc.

Internal computing system 110 can include a control service 112 that is configured to control operation of vehicle propulsion system 130, braking system 132, steering system 134, safety system 136, and cabin system 138. Control service 112 receives sensor signals from sensor systems 104-108 as well as communicates with other services of internal computing system 110 to effectuate operation of autonomous vehicle 102. In some embodiments, control service 112 may carry out operations in concert one or more other systems of autonomous vehicle 102. Internal computing system 110 can also include constraint service 114 to facilitate safe propulsion of autonomous vehicle 102. Constraint service 114 includes instructions for activating a constraint based on a rule-based restriction upon operation of autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service 114 can be part of control service 112.

The internal computing system 110 can also include communication service 116. The communication service 116 can include both software and hardware elements for transmitting and receiving signals from/to the remote computing system 150. Communication service 116 is configured to transmit information wirelessly over a network, for example, through an antenna array that provides personal cellular (long-term evolution (LTE), 3G, 4G, 5G, etc.) communication.

Internal computing system 110 can also include latency service 118. Latency service 118 can utilize timestamps on communications to and from remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, latency service 118 can enable other systems of autonomous vehicle 102 or a passenger to make necessary decisions or to provide the needed feedback.

Internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

Remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102. Remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

Figure 4:
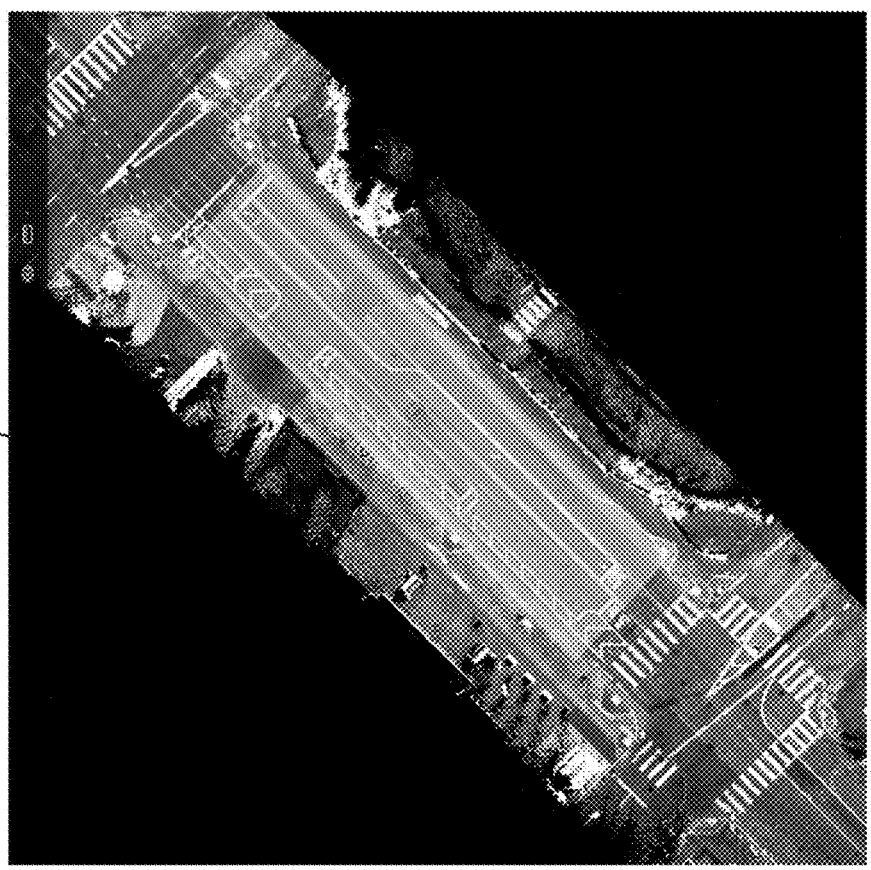
FIG. 4 illustrates an example of a map tile with incorrect lane paint and an updated map tile with new lane paint, according to some aspects of the disclosed technology.
Figure 4:

Remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102. Remote computing system 150 can also include rideshare service 158 and package service 162 configured to interact with ridesharing applications 170 operating on (potential) passenger computing devices. The rideshare service 158 and/or delivery service 172 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc. Remote computing system 150 can, in some cases, include at least one computing system 150 as illustrated in or discussed with respect to FIG. 4, or may include at least a subset of the components illustrated in FIG. 4 or discussed with respect to computing system 150.

Figure 2:
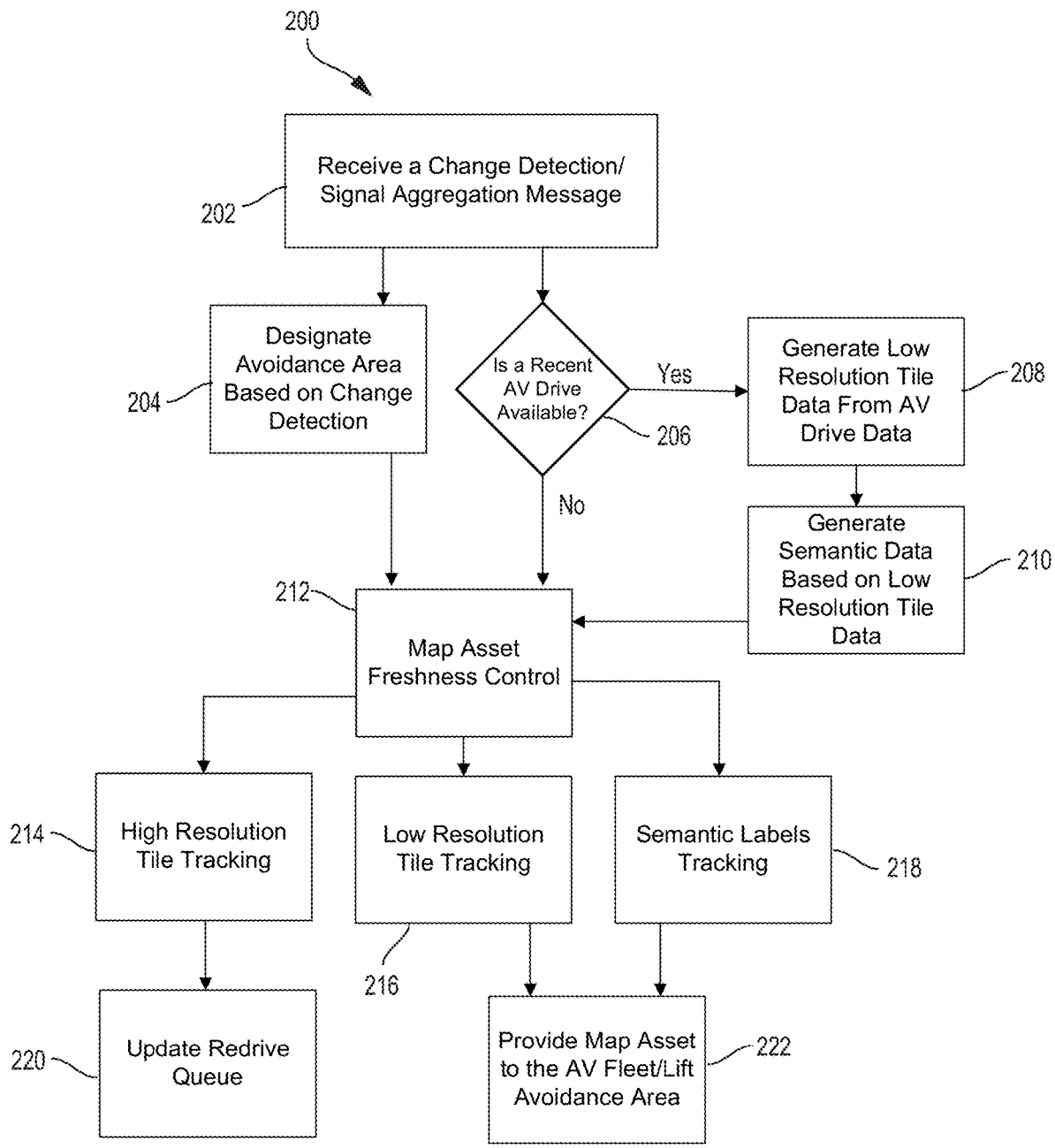
FIG. 2 illustrates steps of an example process for updating high definition maps based on low resolution map assets, according to some aspects of the disclosed technology.

FIG. 2 illustrates steps of an example process 200 for updating high definition maps based on low resolution map assets, according to some aspects of the disclosed technology. Process 200 begins with step 202, in which a remote computing system (e.g., remote computing system 150 of FIG. 1), offline service center, cloud-based computing system, or any other system suitable for the intended purpose and understood by a person of ordinary skill in the art, receives a change detection. For example, an autonomous vehicle may detect a change in a map during a drive. In some embodiments, after the drive, change detectors can be executed on autonomous vehicle data that can also be stored in a remote computing system (e.g., a change detection platform). For example, the change detector process can be executed "offline" and may take place after the drive actually occurs. The change detector process can further include a reviewer who checks when a change detector flags a change and validates that the detected change, in fact, needs to be updated.

A change detection platform can be configured to manage change detection signals by modulating between high-quality and low-quality signals on a per-region basis. In some embodiments, the change detection platform can manage change detection signals as a function of signal source. For example, the change detection platform can predict accuracy and/or relevance of data received from various map change data sources, including but not limited to: human operators, online change detectors, offline change detectors, and/or third-party data streams, etc. The change detection system can further calculate highly granular map change data for a given geographic region (or an entire map, for example, by predicting accuracy, precision, and/or recall statistics for different map feature types.

The change that is detected can include removed/replaced traffic signs, construction barriers, lane marking changes, or any other changes between two versions of maps (e.g., between the real world and the map on the autonomous vehicle). The remote computing system may also receive a signal aggregation message from autonomous vehicles of a fleet, users, or electronic devices relating to a change detected in a map for the autonomous vehicle. In some embodiments, notes or signals can be received from autonomous vehicle operators of a supervised fleet and indicate a change in a map feature to detect changes and place avoidance areas around the detected change. In another embodiment, change detection algorithms can be utilized by the autonomous vehicle or change detection platform that are feature specific on drive data from an autonomous vehicle fleet. These change detection algorithms can be based on camera images and lidar data.

In some implementations, if the remote computing system receives a change detection at step 202, process 200 may advance to step 204, in which the remote computing system designates an avoidance area around the location of the change that is detected. By designating an avoidance area, autonomous vehicles of the fleet can update routes around the designated area to efficiently reach their intended final destination without encountering the location of a map feature change (e.g., the real world change).

Process 200 can also include a step of determining whether a recent autonomous vehicle drive proximate to the detected real world change is available at step 206. If available, process 200 can proceed to step 208, which includes generating low resolution tile data from the available autonomous vehicle drive data. One example includes the remoting computing system receiving and analyzing autonomous vehicle data received from autonomous vehicles of the fleet to generate the low resolution tile data based on the autonomous vehicle data at step 208 of process 200. Alternatively, an autonomous vehicle can generate the low resolution tile data based on the autonomous vehicle data, the autonomous vehicle data either being from its own autonomous vehicle data or autonomous vehicle data from another autonomous vehicle. The autonomous vehicle drive data can include camera imagery data from the autonomous vehicle. Camera image data can be utilized by the remote computing system to verify that a change has in fact occurred in response to a change detection signal. Camera image data can further be utilized to generate semantic updates (step 210 of process 200) since low resolution tiles may not have certain information such as color.

Figure 3:
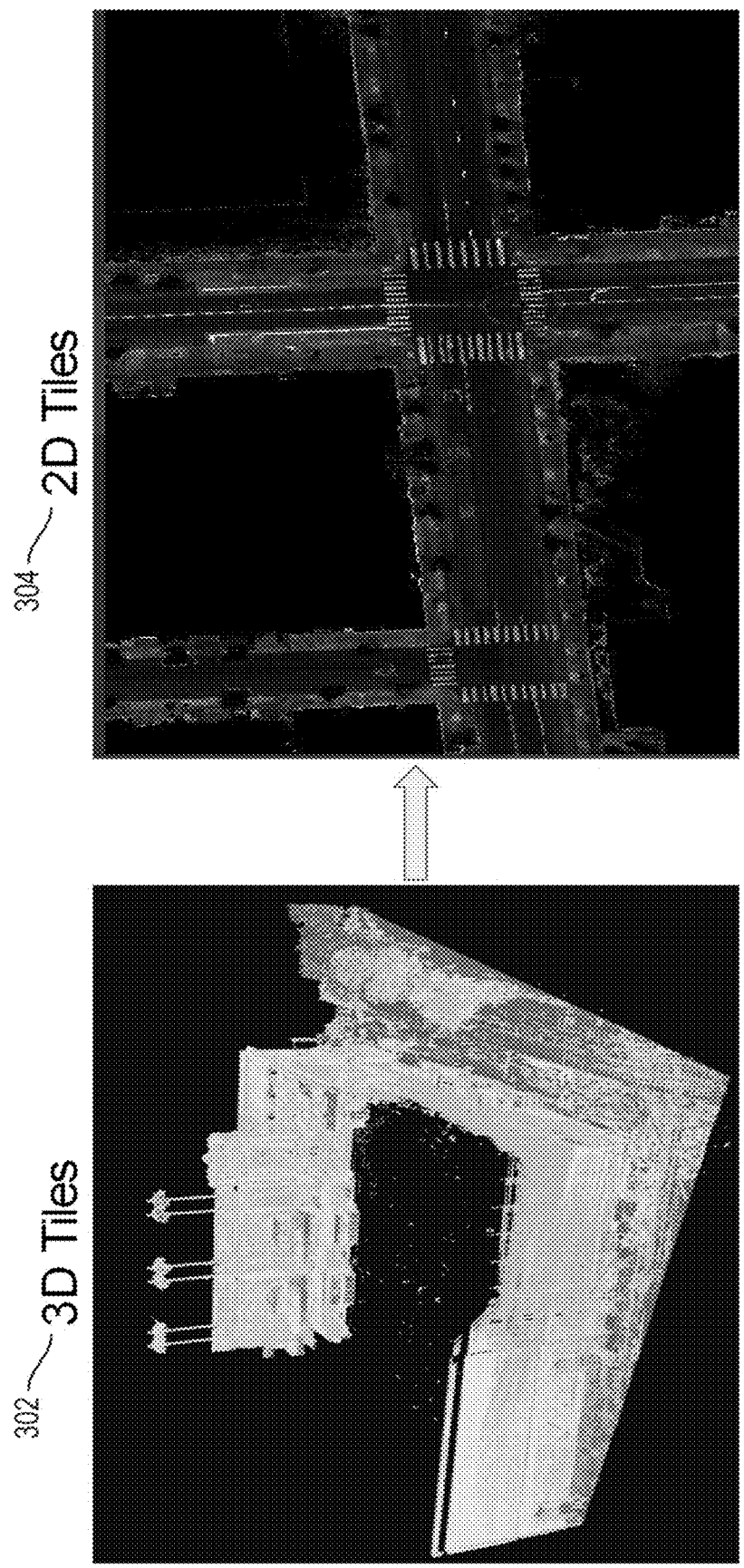
FIG. 3 illustrates examples of 2D and 3D tiles, according to some aspects of the disclosed technology.

In some embodiments, whenever there exists a recent autonomous vehicle drive for an area (e.g., which can include data received from the various sensors, cameras, and lidar of the autonomous vehicle), the remote computing system can then receive and analyze this data (e.g., 3D Tiles 302 of FIG. 3) and generate updated map assets (e.g., low resolution tiles such as 2D Tiles 304 of FIG. 3 and 402, 404 of FIG. 4) that can then be provided to the autonomous vehicles. In some implementations, the low resolution tiles generated from data from multiple autonomous vehicles can be "stitched" together to provide a view of the area of the detected change to determine whether a change to high resolution tiles are necessary. The updated map assets can further be utilized by autonomous vehicles to supplement 3D maps or high resolution tiles without having to send out autonomous vehicles to capture new 3D maps or high resolution tiles. By utilizing the drive data to generate updated map assets, the remote computing system can lift the avoidance areas in a faster and more efficient manner because detected changes have been accounted for and base maps of the autonomous vehicles updated accordingly.

In change signal methods whether online or offline, an autonomous vehicle drive may already exist and include autonomous vehicle data. For example, autonomous vehicle data can include lidar, camera, or sensor data that was collected from the autonomous vehicle's drive, which may be utilized by the remote computing system to determine any changes in the real world and to designate appropriate semantic labels accordingly. Process 200 may also include enabling selection of a polygon-based area on the map and generate a low resolution tile. In some implementations, the updated map assets can also be utilized and provided to update semantic labels for any type of task (e.g., issue triage, labelling, etc.) set forth by the autonomous vehicle or remote computing system.

Process 200 may then advance to step 210 and generate a semantic update that includes generating semantic data based on the low resolution tile data of step 208. For example, the semantic update can include: 2D features such as lane lines, stop lines, cross walks, lane boundary geometry, intersection geometry, etc.; and 2D location of stop signs, traffic lights, curbs, etc. In some implementations, once semantic labels are updated and a base map (e.g., current map version) is not, process 200 can include maintaining inconsistencies in control by utilizing tracking mechanisms and low priority "redrive" queues (e.g., a list of drives to be performed by autonomous vehicles to remap/scan designated locations). Once the semantic data of step 210 has been generated, the semantic data can then be directed to step 212 of process 200.

In some implementations, the autonomous vehicle data can include lidar data and session information. For example, the autonomous vehicle data can include lidar data that can be extracted and stitched together. Multiple passes may be performed to stitch the extracted data together. If there are multiple passes, the quality is better because there will be more coverage. However, a single pass is informative and may depend on the type of lidar data collected in that area. The autonomous vehicle data may also include positional information of the autonomous vehicles of the fleet. The same process as described above may be utilized to generate lidar tiles, which may generate a lidar map. The remote computing system may analyze the lidar data (e.g., 302 of FIG. 3) and generate a 2D representation (304 of FIG. 3, 402 of FIG. 4), which is a tile. For example, a map tile may be a pixelated version of a lidar point cloud. The map tiles include grids having X-Y coordinates, and a height associated with each pixel. The tile may also include intensity information. For example, as shown in 404 of FIG. 4, a lane paint line can be seen in a higher intensity compared to an asphalt road, which is why this can be used for labeling.

If recent autonomous vehicle drive data is not available at step 206, process 200 can directly proceed to step 212. Step 212 of process 200 can include assessing updated map assets from step 208 or generated semantic updates from step 210 that may also be related to freshness control. For example, after receiving a change detection at step 202, process 200 can further include proceeding to step 214 (e.g., high resolution tile tracking), step 216 (e.g., low resolution tile tracking), and/or step 218 (e.g., semantic labels tracking) based on the updated map assets from step 208 or the generated semantic updates from step 210. In some implementations, in order to track the freshness of the high resolution tile, low resolution tiles and the semantic labels/features may be updated using either of these assets. The remote computing system may include a tracking scheme that may trigger a service level agreement (SLA)-based task for recollection and refreshing of the high resolution tile (e.g., base map) that may require a redrive. This can be accounted for in the low priority queue in step 220 of process 200.

Low resolution assets generated by process 200 may utilize an offline pipeline that further includes date and timestamps based on the date of the drive associated with the generation. Feature identification and minisections identification may be updated using the low resolution tile asset to have a log of the assets (e.g., tiles and images) that may be utilized for updating the dates and timestamps. Avoidance areas, as described herein, may be placed to have a log of the assets (e.g., tiles and images) used to place it. Lifted avoidance areas may also be lifted and have a log of the assets (e.g., tiles and images) used to lift it and/or modify it. For example, if a change occurs on November 21 at a particular location, the remote computing system can review all of the files (e.g., data, maps, tiles, labels, etc.) from the autonomous vehicle fleet that have driven within a vicinity of the detected change location, after the change has been detected. In another embodiment, the remote computing system can determine the most recent autonomous vehicle drives and confirm whether or not it has data indicative of the change that was detected. For example, a real world sign was changed on November 1, an autonomous vehicle of the fleet drives past the real world sign on November 5 (but does not detect the change), but then the remote computing system detects the change on November 10. In such an instance, the remote computing system can pull the November 5 data and confirm that it has the data required to update the map data. The remote computing system may then perform process 200 and run the pipelines as described herein on the autonomous vehicle data that correspond to the area that the change is detected.

In some implementations, as in step 214 of process 200, the remote computing system may determine that a base lidar map (e.g., a high resolution tile) may need to be updated, thereby requiring a redrive of the location in question (e.g., the area surrounding the location of the detected change) utilizing a mapping car. For example, major 3D feature changes detected at step 202 (e.g., changes to curbs, repavement, speed bumps, or any other major change in the drivable area such as buildings, medians, etc.) may affect a height map for perception and localization, thereby potentially necessitating that the lidar tile assets of the autonomous vehicle be updated. In such a case, process 200 may proceed to step 220, where a redrive queue is updated to include a redrive of the location surrounding the location of the detected change.

The remaining features (e.g., low resolution tiles and semantic labels) of steps 216 and 218 of process 200 may be updated without immediately requiring the update of the high resolution lidar tiles (e.g., of step 214) of the base map of the autonomous vehicle. For example, the low resolution tile tracking of step 216 can include updating low resolution tiles and colorized tiles without requiring the need for a mapping car to redrive the area surrounding the location of the detected change. Moreover, the semantic labels tracking of step 218 can include updating the semantic labels without requiring the need for a mapping car to redrive the area surrounding the location of the detected change. If the detected change is determined to be a discrepancy by analyzing the autonomous vehicle camera data, a redrive may be entered into the queue of step 220 for the area surrounding the detected change. If the detected change is determined to be a discrepancy in the data via labeling errors, then a redrive of the area surrounding the detected change may not be necessary and no new map assets may be required. Steps 214, 216, and 218 of process 200 may further occur simultaneously or at different times/stages. For example, a low priority redrive queue of step 220 can be established or updated for the base map while the semantic labels and/or low resolution tiles of steps 216 and 218 are updated independently from step 214 of process 200. In addition, the low resolution tile tracking may store metadata indicative of when the updated low resolution tile data was generated and what assets were used to generate the low resolution tile data. Likewise, semantic label tracking may store metadata of when the updated semantic labels were created and which assets (e.g., low resolution tile) were used to generate the updated semantic label. Process 200 can further be utilized for 2D semantic features on the map of the autonomous vehicle. With the ability to generate 3D autonomous vehicle tiles, process 200 can also be utilized to update 3D features such as traffic lights on the map of the autonomous vehicle.

In some implementations, process 200 can further include step 222, which provides the map assets generated by the remote computing system to the autonomous vehicles of the fleet. Step 222 of process 200 can also include lifting the avoidance area around the detected real world change so that the autonomous vehicle fleet can enter the avoidance area. For example, signals or messages can be provided to the autonomous vehicle fleet from the remote computing system that include data that designates that the avoidance area may be removed accordingly. Step 222 of process 200 can also be facilitated wirelessly, with periodic updates sent to the autonomous vehicles of the fleet. In other implementations, if updated map assets for detected change are available via process 200, the updated map assets may be provided to autonomous vehicles that are within a range of the detected change (e.g., within 25 miles of the location of the detected change).

In other implementations, changes in the real world as described herein can trigger investigations by the remote computing system. For example, autonomous vehicle tiles and camera imagery can be received from an autonomous vehicle fleet, which can then be analyzed to determine whether a change has occurred at a particular location. The autonomous vehicle tiles can also be utilized to update semantic features (e.g., semantic labeling), which can then be provided to the autonomous vehicles of the fleet to update features on the semantic map of the autonomous vehicles.

Figure 5:
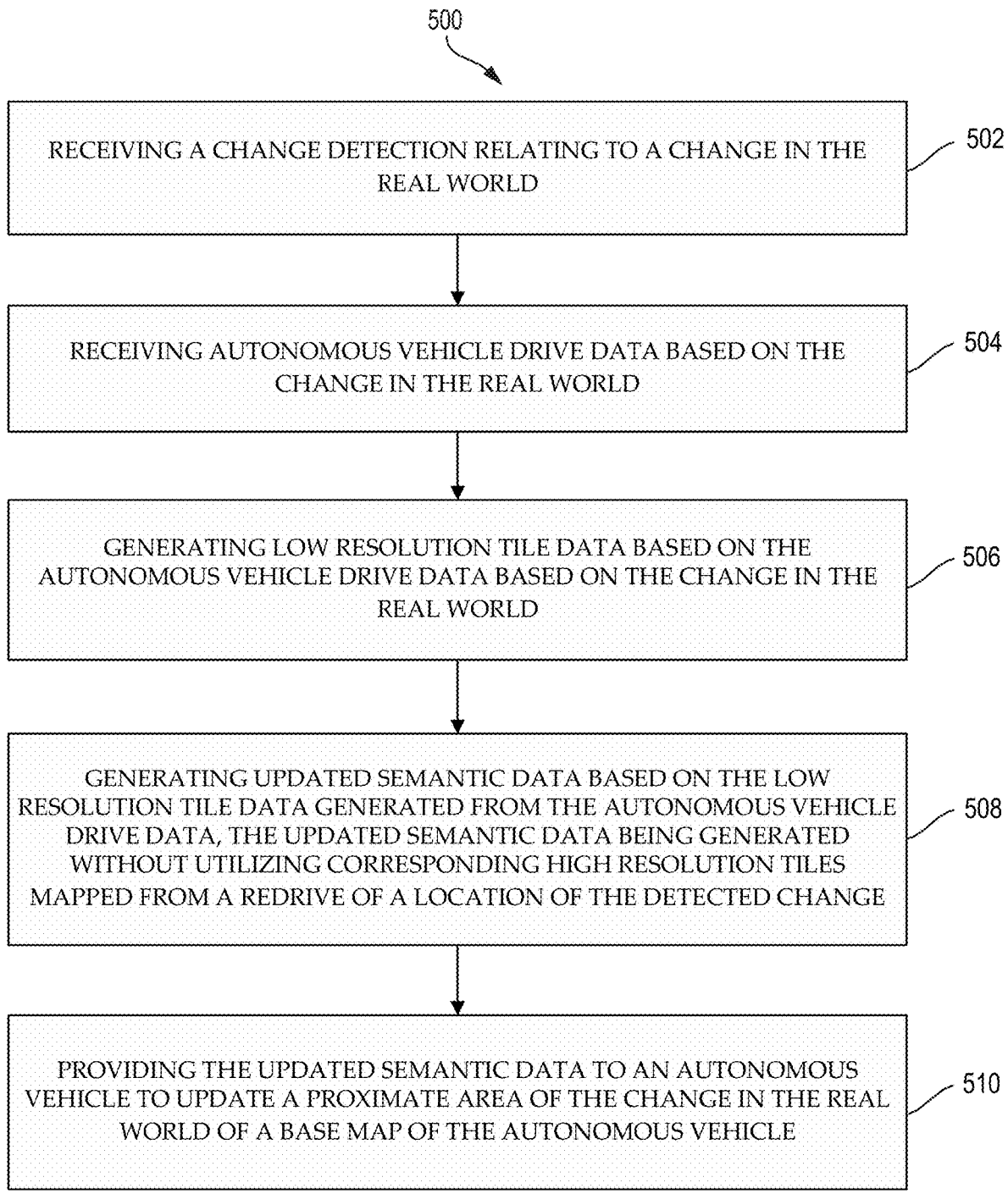
FIG. 5 illustrates an example process for updating high definition maps based on low resolution map assets, according to some aspects of the disclosed technology.

Having disclosed some example system components and concepts, the disclosure now turns to FIG. 5, which illustrates an example method 500 for updating high definition maps based on low resolution map assets. The steps outlined herein are exemplary and can be implemented in any combination thereof, including combinations that exclude, add, or modify certain steps.

At step 502, the method 500 can include receiving, at a remote computing system, a change detection relating to a change in the real world. The change detection can include an inconsistency between the base map of the autonomous vehicle and the real world.

At step 504, the method 500 can include receiving, at the remote computing system, autonomous vehicle drive data based on the change in the real world. The autonomous vehicle drive data can include a timestamp that is before the change detection is received and after the change in the real world. The receiving of the autonomous vehicle drive data can be received from a plurality of autonomous vehicles of a fleet. The low resolution tile data can be stitched together to form the updated low resolution tile data.

At step 506, the method 500 can include generating, by the remote computing system, low resolution tile data based on the autonomous vehicle drive data based on the change in the real world.

At step 508, the method 500 can include generating, by the remote computing system, updated semantic data based on the low resolution tile data generated from the autonomous vehicle drive data, the updated semantic data being generated without utilizing corresponding high resolution tiles mapped from a redrive of a location of the detected change.

At step 510, the method 500 can include providing, by the remote computing system, the updated semantic data to an autonomous vehicle to update a proximate area of the change in the real world of a base map of the autonomous vehicle.

The method 500 can further include designating, by the remote computing system, an avoidance area over an area proximate to the location of the detected change. Moreover, the method 500 can also include removing, by the remote computing system, the avoidance area after determining that the updated semantic data addresses the detected change.

Figure 6:
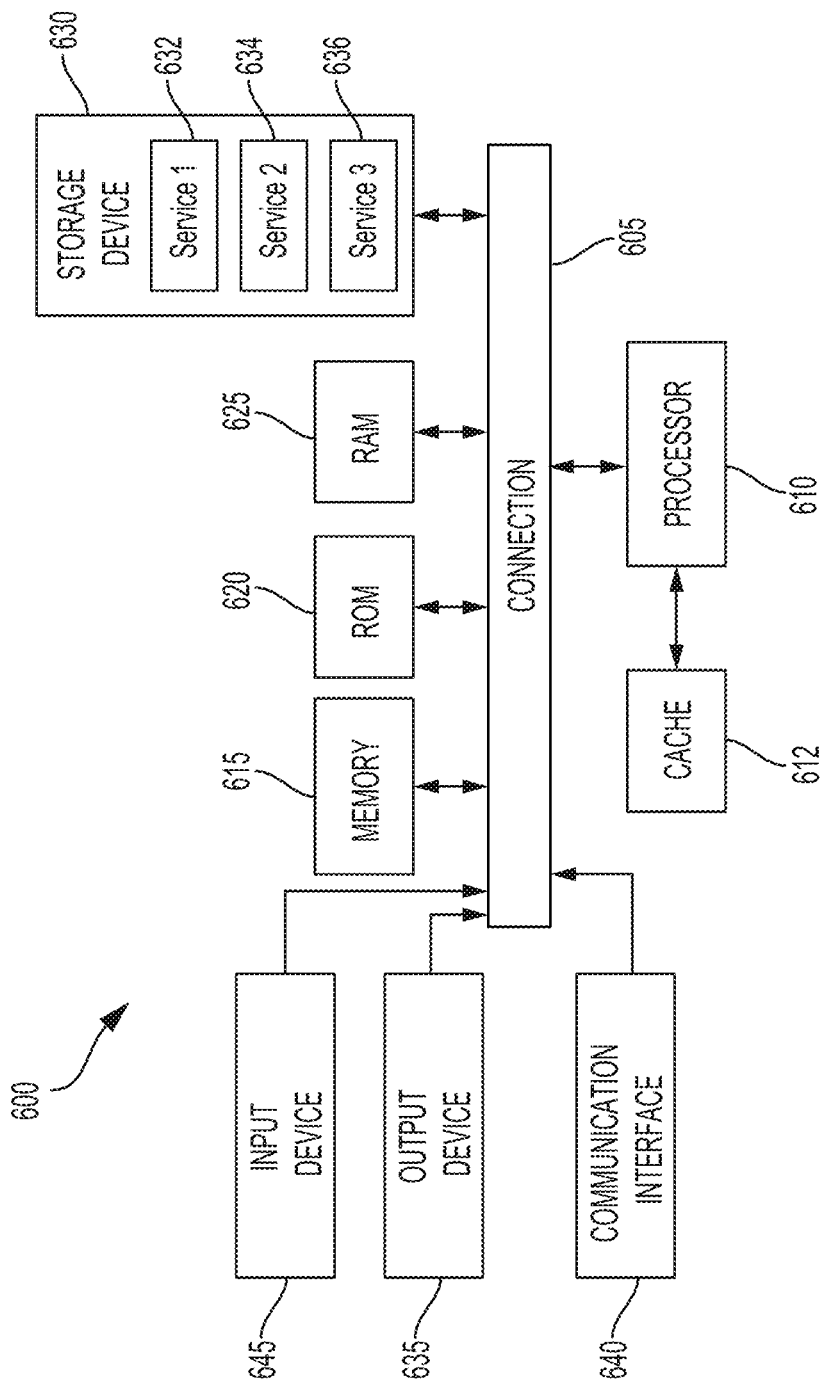
FIG. 6 illustrates an example processor-based system with which some aspects of the subject technology can be implemented.

FIG. 6 illustrates an example processor-based system with which some aspects of the subject technology can be implemented. For example, processor-based system 600 that can be any computing device making up internal computing system 110, remote computing system 150, a passenger device executing the rideshare app 170, vehicle propulsion system 130, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random-access memory (RAM) 625 to processor 610. Computing system 600 can include a cache of high-speed memory 612 connected directly with, in close proximity to, and/or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. By way of example computer-executable instructions can be used to implement perception system functionality for determining when sensor cleaning operations are needed or should begin. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method comprising:
   receiving, at a remote computing system, a plurality of change detection signals that include high resolution signals and low resolution signals corresponding to a real-world environment, wherein the remote computing system includes a change detection platform configured to manage and prioritize the plurality of change detection signals based on a predicted accuracy of each of the plurality of change detection signals and by modulating between the high resolution signals and the low resolution signals on a per-region basis encompassing the real-world environment;
   determining, at a remote computing system, a change detection corresponding to a low priority inconsistency between a high-definition base map and the real-world environment, wherein the change detection is based on at least one change detection signal from the plurality of change detection signals that is generated by a first autonomous vehicle as the first autonomous vehicle navigates the real-world environment, and wherein the high-definition base map is based on high-resolution sensor data collected by a mapping vehicle;
   receiving, at the remote computing system, two-dimensional camera image data corresponding to the real-world environment from a second autonomous vehicle, wherein the two-dimensional camera image data is collected by the second autonomous vehicle as the second autonomous vehicle navigates a proximate area of the real-world environment;
   generating, by the remote computing system, low resolution, two-dimensional tile data based on the two-dimensional camera image data received from the second autonomous vehicle;
   generating, by the remote computing system, updated semantic data based on the low resolution, two-dimensional tile data generated from the two-dimensional camera image data received from the second autonomous vehicle, wherein the updated semantic data is generated without utilizing corresponding high resolution tiles mapped from a redrive of the real-world environment by the mapping vehicle;
   providing, by the remote computing system, the updated semantic data to the first autonomous vehicle corresponding to the real-world environment; and
   directing the first autonomous vehicle to navigate the real-world environment in accordance with the updated semantic data corresponding to the real-world environment and the high-definition base map, the high-definition base map still having the low priority inconsistency between the high-definition base map and the real-world environment.

2. The computer-implemented method of claim 1, wherein the two-dimensional camera image data includes a timestamp that is before the change detection is determined.

3. The computer-implemented method of claim 1, wherein the two-dimensional camera image data corresponding to the real-world environment is collected by a plurality of autonomous vehicles of a fleet.

4. The computer-implemented method of claim 3, wherein the low resolution, two dimensional tile data is stitched together using the two-dimensional camera image data collected by the plurality of autonomous vehicles to provide a view of the real-world environment, and wherein a change to one or more high resolution tiles of the high-definition base map is determined to be necessary based on the view of the real-world environment.

5. The computer-implemented method of claim 1, further comprising designating, by the remote computing system, an avoidance area over an area proximate to the real-world environment.

6. The computer-implemented method of claim 5, further comprising removing, by the remote computing system, the avoidance area after determining that the updated semantic data resolves the inconsistency between the high-definition base map and the real-world environment.

7. The computer-implemented method of claim 1, wherein the updated semantic data is generated without utilizing high resolution tiles that are based on lidar data obtained from a redrive by the mapping vehicle of the real-world environment.

8. The computer-implemented method of claim 1, further comprising:
   detecting, based on the low resolution, two-dimensional tile data, one or more three-dimensional feature changes in the high-definition base map; and
   in response to detecting the one or more three-dimensional feature changes, directing the mapping vehicle to perform a redrive of the real-world environment to update the high-definition base map.

9. A system comprising:
   one or more processors; and
   at least one computer-readable storage medium having stored therein instructions which, when executed by the one or more processors, cause the system to:
      receive, by a change detection platform, a plurality of change detection signals that include high resolution signals and low resolution signals corresponding to a real-world environment, wherein the change detection platform is configured to manage and prioritize the plurality of change detection signals based on a predicted accuracy of each of the plurality of change detection signals and by modulating between the high resolution signals and the low resolution signals on a per-region basis encompassing the real-world environment;
      determine a change detection corresponding to a low priority inconsistency between a high-definition base map and a real-world environment, wherein the change detection is based on at least one change detection signal from the plurality of change detection signals that is generated by a first autonomous vehicle as the first autonomous vehicle navigates the real-world environment, and wherein the high-definition base map is based on high-resolution sensor data collected by a mapping vehicle;

receive two-dimensional camera image data corresponding to the real-world environment from a second autonomous vehicle, wherein the two-dimensional camera image data is collected by the second autonomous vehicle as the second autonomous vehicle navigates a proximate area of the real-world environment;

generate low resolution, two-dimensional tile data based on the two-dimensional camera image data received from the second autonomous vehicle;

generate updated semantic data based on the low resolution, two-dimensional tile data generated from the two-dimensional camera image data received from the second autonomous vehicle, wherein the updated semantic data is generated without utilizing corresponding high resolution tiles mapped from a redrive of the real-world environment by the mapping vehicle;

provide the updated semantic data to the first autonomous vehicle corresponding to the real-world environment; and direct the first autonomous vehicle to navigate the real-world environment in accordance with the updated semantic data corresponding to the real-world environment and the high-definition base map, the high-definition base map still having the low priority inconsistency between the high-definition base map and the real-world environment.

10. The system of claim 9, wherein the two-dimensional camera image data includes a timestamp that is before the change detection is determined.

11. The system of claim 9, wherein the two-dimensional camera image data corresponding to the real-world environment is collected by a plurality of autonomous vehicles of a fleet.

12. The system of claim 11, wherein the low resolution, two-dimensional tile data is stitched together using the two-dimensional camera image data collected by the plurality of autonomous vehicles to provide a view of the real-world environment, and wherein a change to one or more high resolution tiles of the high-definition base map is determined to be necessary based on the view of the real-world environment.

13. The system of claim 9, wherein the instructions which, when executed by the one or more processors, further cause the system to designate an avoidance area over an area proximate to the real-world environment.

14. The system of claim 13, wherein the instructions which, when executed by the one or more processors, further cause the system to remove the avoidance area after determining that the updated semantic data resolves the inconsistency between the high-definition base map and the real-world environment.

15. A non-transitory computer-readable storage medium comprising:

instructions stored on the non-transitory computer-readable storage medium, the instructions, when executed by one or more processors, cause the one or more processors to:

receive, by a change detection platform, a plurality of change detection signals that include high resolution signals and low resolution signals corresponding to a real-world environment, wherein the change detection platform is configured to manage and prioritize the plurality of change detection signals based on a predicted accuracy of each of the plurality of change detection signals and by modulating between the high resolution signals and the low resolution signals on a per-region basis encompassing the real-world environment;

determine a change detection corresponding to a low priority inconsistency between a high-definition base map and a real-world environment, wherein the change detection is based on at least one change detection signal from the plurality of change detection signals that is generated by a first autonomous vehicle as the first autonomous vehicle navigates the real-world environment, and wherein the high-definition base map is based on high-resolution sensor data collected by a mapping vehicle;

receive two-dimensional camera image data corresponding to the real-world environment from a second autonomous vehicle, wherein the two-dimensional camera image data is collected by the second autonomous vehicle as the second autonomous vehicle navigates a proximate area of the real-world environment;

generate low resolution, two-dimensional tile data based on the two-dimensional camera image data received from the second autonomous vehicle;

generate updated semantic data based on the low resolution, two-dimensional tile data generated from the two-dimensional camera image data received from the second autonomous vehicle, wherein the updated semantic data is generated without utilizing corresponding high resolution tiles mapped from a redrive of the real-world environment by the mapping vehicle;

provide the updated semantic data to the first autonomous vehicle corresponding to the real-world environment;

direct the first autonomous vehicle to navigate the real-world environment in accordance with the updated semantic data corresponding to the real-world environment and the high-definition base map, the high-definition base map still having the low priority inconsistency between the high-definition base map and the real-world environment; and queue a low priority redrive of the location of the detected change for the mapping vehicle to update the high-definition base map.

16. The non-transitory computer-readable storage medium of claim 15, wherein the two-dimensional camera image data includes a timestamp that is before the change detection is determined.

17. The non-transitory computer-readable storage medium of claim 15, wherein the two-dimensional camera image data corresponding to the real-world environment is collected by a plurality of autonomous vehicles of a fleet.

18. The non-transitory computer-readable storage medium of claim 17, wherein the low resolution, two-dimensional tile data is stitched together using the two-dimensional camera image data collected by the plurality of autonomous vehicles to provide a view of the real-world environment, and wherein a change to one or more high resolution tiles of the high-definition base map is determined to be necessary based on the view of the real-world environment.

19. The non-transitory computer-readable storage medium of claim 15, the instructions, when executed by the one or more processors, cause the one or more processors to:
   designate an avoidance area over an area proximate to the real-world environment; and
   remove the avoidance area after determining that the updated semantic data resolves the inconsistency between the high-definition base map and the real-world environment.

* * * * *